United States Patent [19]

Markham et al.

[11] Patent Number: 5,252,116

[45] Date of Patent: Oct. 12, 1993

[54] ORGANIC BASE FERTILIZER FROM MUNICIPAL SEWAGE SLUDGE

[75] Inventors: Earl R. Markham, Amherstburg; John T. Markham, Maidstone; Edward G. Markham, Windsor, all of Canada

[73] Assignee: TRG International Waste Management, Ltd., Windsor, Canada

[21] Appl. No.: 753,513

[22] Filed: Sep. 3, 1991

[51] Int. Cl.⁵ ............................................. C05F 7/00
[52] U.S. Cl. ........................................ 71/13; 71/25; 71/64.05
[58] Field of Search .................... 71/12, 13, 61-63, 71/901, 25, 26, 64.05; 210/751

[56] References Cited

U.S. PATENT DOCUMENTS

| | | | |
|---|---|---|---|
| 3,342,731 | 9/1967 | Baumann | 71/13 |
| 4,326,032 | 4/1982 | Grove | 435/148 |
| 4,554,002 | 11/1985 | Nicholson | 71/12 |
| 4,681,597 | 7/1987 | Byrne et al. | 44/579 |
| 4,781,842 | 11/1988 | Nicholson | 210/751 |
| 4,902,431 | 2/1990 | Nicholson et al. | 210/751 |

OTHER PUBLICATIONS

Agitative Agglomeration, The State of the Art (1987), pp. 59–75, Carl A. Holley, Ferro-Tech, Wyandotte, Mich. 48192.
Binders and Binder Systems for Agglomeration, pp. 77–86, Carl A. Holley, President, Ferro-Tech, Wyandotte, Mich. 48192, Aug. 1981.
Waste Agglomeration, Carl A. Holley, President, Ferro-Tech, Incorporated, Wyandotte, Michigan U.S.A., pp. 99–125, Nov. 1989.
Cement Kiln Dust Utilization and Treatment, pp. 163–165, Carl A. Holley, President Ferro-Tech, Aug. 1983.
The Ferro-Tech-Turbulator, Ferro-Tech, Wyandotte, Mich. 48192, pp. 269–271, Feb. 1987.

*Primary Examiner*—Ferris Lander
*Attorney, Agent, or Firm*—Howard & Howard

[57] ABSTRACT

A process for the production of a granular fertilizer product from biological or municipal sewage sludge is described. This process involves (1) gently blending the biological sludge with sufficient lime-containing material (preferably lime kiln dust) to raise the pH of the blended material to at least 11 pH units, and preferably at least 12 pH units, in such a manner as to avoid or prevent the formation of a slurry; (2) then conditioning the blended materials at a temperature of 180° F. and a pH of at least 11, and preferably at least 12, for a time sufficient to effectively kill or otherwise destroy a significant percentage of the pathogens present in the sludge; (3) blending the conditioned sludge with a second lime-containing material (preferably cement kiln dust or fly ash) and a binder (preferably lignosulfonate); (4) then agglomerating the blended materials to form pellets or granules; (5) drying the pellets or granules to a moisture content of less than 15 weight percent; (6) and curing the dried pellets or granules at ambient temperatures for a time sufficient for the pellets or granules to develop sufficient physical strength to be used as a fertilizer. The product of this invention can be used directly as a low-grade fertilizer or, if desired, additional nutrients or other additives can be added to upgrade its fertilizer value.

29 Claims, 3 Drawing Sheets

ORGANIC BASE FERTILIZER FROM MUNICIPAL SEWAGE SLUDGE

FIELD OF THE INVENTION

The present invention relates generally to the treatment of biological sludges including municipal sewage sludges. More specifically, this invention relates to the preparation of an organic base fertilizer from biological sludges and municipal sewage sludges. The organic base fertilizer can be used as a low-grade fertilizer or can be used as a base for preparing fertilizer containing higher levels of plant nutrients.

BACKGROUND OF THE INVENTION

The treatment of biological sludges, including municipal sewage sludges, has become an increasing large problem due, in large part, to the increasing volumes of such wastes and the increased environmental awareness and regulations covering the processing and disposal of such wastes. Current and past procedures for the treatment and disposal of municipal sewage sludges can generally be divided into four major processes: lime stabilization, composting, application of raw sewage sludge to agriculture land, and incorporation of raw sewage sludge in landfill sites. Generally, the application of raw sewage to agricultural land or disposal in landfills is no longer a viable or responsible option in the industrialized world. Any such disposal by these just-mentioned practices is likely to be even less utilized in the future due to increasingly strict environmental regulations and the shortage of land for landfill purposes. The other two procedures—lime stabilization and composting—continued to be used in spite of significant drawbacks and problems associated with the processes.

In the composting method, municipal sludge is mixed with aeration type materials, such as wood chips or chopped tires, and placed directly on the ground to decompose and dry. The material is turned several times in order to further aerate the pile. At some later time —often on the order of months—the material becomes dried sludge. During the composting period, this method can often result in significant complaints from neighbor due to the sewage-like smell and the attraction of disease vectors such as rodents, flies, and the like. Problems associated with noxious odor can become especially troublesome if the composting piles are not carefully monitored and turned at the appropriate times to insure adequate aeration during decomposition. In addition, such composting procedures require significant land resources to compost the sewage sludge from even small municipal districts.

Lime stabilization has been used to disinfect and deodorize sewage wastes since at least the time of the Roman Empire. Generally lime stabilization employs lime, especially high calcium carbonate lime, mixed at a rate of about 10 weight percent or higher with the sewage sludge. The mixture is then stored, often directly on the ground, for later application to agriculture lands. The materials produced vary considerably in nutrient value, pathogen content, consistency, and suitability for land application. The lime stabilization process can also produce significant amounts of a leachate containing high levels of nitrates and heavy metals. Normally this leachate is either allowed to drain directly into the ground (and, perhaps, utimately into ground or surface water) or is simply collected and piped back into the municipal sewage treatment system to be passed through the system again. Neither method of disposing this leachate is desirable.

Both of these processes, as well as subsequent disposal or utilization of the resulting treated sludge, have, as noted above, significant drawbacks, limitations, and problems. Handling and subsequent application of treated sludge prepared from either composting or lime stabilization procedures are especially troublesome. For example, the bulk treated sludge must be transported to the application site where it is usually dumped directly on the ground in a large pile or piles. Any leachate draining from these piles will directly contaminate the ground and, in some cases, the ground or surface water. From such piles, the material must be loaded into spreading equipment and then applied over the target land. In addition to packing and compacting the land, this procedure is both slow and cumbersome. The amount of material to be applied over a given land area is determined more by the amount of treated sludge to be disposed and the area of land available rather than the nutrient needs of the land. In addition, because the texture of the materials vary considerably depending on the temperature and age of the treated sludge, uniform application is difficult and depends almost entirely upon the skill and experience of the applicator. In sum, application of such materials is destructive of the land, unpleasant and perhaps unhealthy due to dust and noxious odors associated with the treated sludge, and provides a low-grade fertilizer which cannot easily be applied in a uniform and consistent manner. Due to these problems, the agriculture market demand for treated sludge is essentially nonexistent. Rather, the contractor who generates the treated sludge must locate the land for application and then pay for freight, equipment, and application costs. Such costs, of course, add directly to the costs municipalities must bear to treat and dispose of their wastes.

Recently the United States Environmental Protection Agency (EPA) has promulgated rules governing the treatment of municipal sludges and the application or incorporation of such treated materials onto or into the ground. Under Title 40 of the Code of Federal Regulations, Part 257 (i.e., 40 CFR Part 257), a Process to Significantly Reduce Pathogens (PSRP) must be used where sewage sludges are applied to land surfaces or incorporated into soil where the public has access to the land within twelve months of the application or incorporation or where grazing animals whose products are consumed by humans are allowed to graze the land within one month of the application or incorporation. Under these same regulations, a Process to Further Reduce Pathogens (PFRP) must be used where sewage sludges are applied to land surfaces or incorporated into soil where crops for direct human consumption will be grown within the next eighteen months. Currently approved PSRP processes include aerobic digestion, air drying, anaerobic digestion, composting, and lime stabilization. Provision is also made for other treatment methods which provide equivalent reduction in pathogens and vector attraction relative to the just listed methods. Currently approved PFRP processes include composting at elevated temperatures, heat drying, heat treatment, and thermophilic aerobic digestion. Other methods, if shown to provide equivalent reduction in pathogens and vector attraction to the listed PFRP methods, can be used.

In U.S. Pat. No. 4,554,002, a method for treating wastewater treatment sludge was described. This method involved the addition of kiln dust from either cement or lime plants to the sludge to reduce pathogens and dry the waste prior to land application. The materials were exposed to ambient temperatures without compacting for a time sufficient to produce a so-called "disintegratable, friable product which can be applied to land as a soil conditioner." According to this patent, the kiln dust and waste sludge mixture must be cured "at ambient temperatures at least three days or preferably until it achieves sufficient cohesiveness to be granulated, shredded, crushed, etc., into particles resembling a bank run sand and gravel mixture."

In U.S. Pat. Nos. 4,781,842 and 4,902,431, a method is disclosed for decontaminating wastewater sludges wherein lime or kiln dust are mixed with the wastewater sludge in sufficient quantity to raise the pH of the mixture to 12 for at least two hours and then drying the resulting mixture with an aeration process. In order to achieve PFRP reduction in pathogens it was necessary to dry the lime stabilized sludge with aeration drying such that the sludge contains less than 20 percent, and preferably less than 10 percent, moisture content. The aeration drying process consisted of applying the lime-treated sludge to the ground in windrows that were mixed two to three times a week with a "Brown Bear" aerating device. After considerably drying times—often 30 or more days, often considerably more, depending on the ambient temperature and precipitation conditions—a material was obtained that could be applied to the land as fertilizer or as a landfill cover.

The lime stabilization procedures of U.S. Pat. Nos. 4,554,002, 4,781,842, and 4,902,431 have several drawbacks. In each case, the materials produced are not consistently in the form of granules or pellets which can be easily applied to the land using conventional agricultural dispersing methods. The drying procedures take considerable time and are very dependent on weather conditions. It may be merely fortuitous if the treated sludge is sufficiently dry and, therefore, ready for land application at approximately the same time the land is available for application; thus, in many instances, the only reliable source of land for applying such treated sludge may be land that is held out of production during a given growing season. The drying procedures also require significant land areas which must essentially be dedicated to such operations. Suitable land for drying the lime-treated sludge (i.e., relatively low cost land with low potential for migration to ground or surface water), if available at all, may be significantly removed from sewage treatment and collection facilities and from the agricultural land to which the dried treated sludge is to be applied, thereby increasing dramatically the transportation and overall costs of the treatment process. Applying the materials directly on the ground during the drying process allows any leachate formed to drain directly into the ground and, perhaps, eventually into the ground or surface water. Such leachate may contain significant levels of nitrates and heavy metals. To Applicant's knowledge, the procedures described in these three patents have not been used or adopted on a large scale. Although demonstration trials have been run using municipal sludge from several municipalities, these procedures have not been adopted in these cities.

It is desirable, therefore, to provide a method of treating biological sludge, including municipal sewage sludge, whereby a granulated or pelletized product suitable for use as an organic base fertilizer can be obtained in a relatively short time in a reproducible and consistent manner. It is also desirable to provide a method of treating biological sludge, including municipal sewage sludge to obtain a granulated or pelletized fertilizer-type product which is physically similar to commercially available fertilizer products and which can be applied using commercially available application procedures and equipment. It is also desirable to provide a granulated or pelletized fertilizer product from municipal sewage sludge which has both plant nutrient value and economic value. It is also desirable to provide a granulated or pelletized fertilizer product from municipal sewage sludge which does not significantly deteriorate over reasonable periods of time and can, therefore, be applied to agricultural land at the optimum time in the agricultural cycle. It is also desirable to provide a method of treating municipal sewage sludge whereby reduction of the pathogen levels and the vector attractiveness of the resulting materials is sufficient to meet or exceed current EPA guidelines. It is also desirable to provide a method of treating municipal sewage sludge whereby leachate from the municipal sewage sludge is contained within the process and is not allowed to escape back into the municipal system or directly into the ground as well as the ground or surface water. The current method and the resulting organic base fertilizer produced from that method, as described herein, are thought to meet these criteria.

SUMMARY OF THE INVENTION

This invention involves a method of treating biological sludge, including municipal sewage sludge, to produce a granulated or pelletized fertilizer product which can be applied to land as a low-grade fertilizer or which can be used as an organic fertilizer base to which other nutrients or additives can be added. This invention also relates to the granulated or pelletized fertilizer product prepared by this method. The present invention allows for the treatment of municipal sewage sludge in a controlled and efficient manner to reproducible manufacture a useful fertilizer product from an otherwise waste material. The fertilizer product obtained should have significantly reduced pathogens levels as well as reduced vector attractiveness. The noxious odors often associated with sewage treatment facilities and sewage sludge are significantly reduced in the present treatment method and in the resulting organic base fertilizer product. The significant reduction in odor should significantly reduce complaints from neighbors of the treatment facility and the treated land area and should significantly increase community acceptance of such treatment facilities and land application practices.

This invention generally involves gently mixing the biological sludge with lime kiln dust to raise the pH to at least 11 (and preferably 12) and then holding the mixture at a temperature of at least 180° F. and a pH of at least 11 (and preferably 12) for a time sufficient to destroy a significant amount of the pathogens that may be present in the biological sludge. After the elevated temperature treatment, cement kiln dust or fly ash is added as a "blotter" (i.e., an agent to adsorb water) along with a binder such as lignosulfonate. After agglomerating the mixture, the granulated product is dried to a moisture content of about 15 weight percent or less and then cured at ambient or slightly elevated temperatures to form a granulated organic base fertilizer which is sufficiently stable (both chemically and mechanically) to be applied to land using conventional fertilizer-type spreading equipment. Additional nutrients or additives can be added to the organic base fertilizer if desired.

One object of the present invention is to provide a method for treatment of biological sludge to form an organic base fertilizer, said method comprising the following steps:

(1) gently mixing the biological sludge with sufficient first lime-containing material calculated to raise the pH of the mixture to at least 11, wherein the mixing and the duration of mixing is such that the mixture is not converted into a slurry;

(2) holding the mixture formed in step (1) at a temperature of at least 180° F. and a pH of at least 11 for a time sufficient to destroy a significant amount of any pathogens present in the biological sludge;

(3) blending the mixture of step (2) with a second lime-containing material and a binder;

(4) agglomerating the mixture of step (3) to form a granulated organic base fertilizer;

(5) drying the granulated organic base fertilizer to a moisture content of less than about 15 weight percent; and (6) storing the dried granulated organic base fertilizer for a time sufficient to allow the granulated organic base fertilizer to cure sufficiently to allow mechanical application of the organic base fertilizer to land.

Another object of the present invention is to provide a granulated organic base fertilizer containing treated biological sludge, lime kiln dust, cement kiln dust or fly ash, and a binder, where said granulated organic base fertilizer is prepared by a method comprising the following steps:

(1) gently mixing the biological sludge with sufficient lime kiln dust calculated to raise the pH of the mixture to at least 11, wherein the mixing and the duration of mixing is such that the mixture is not converted into a slurry;

(2) holding the mixture formed in step (1) at a temperature of at least 180° F. and a pH of at least 11 for a time sufficient to destroy a significant amount of any pathogens present in the biological sludge;

(3) blending the mixture of step (2) with the binder and cement kiln dust or fly ash;

(4) agglomerating the mixture of step (3) to form a granulated organic base fertilizer;

(5) drying the granulated organic base fertilizer to a moisture content of less than about 15 weight percent; and (6) storing the dried granulated organic base fertilizer for a time sufficient to allow the granulated organic base fertilizer to cure sufficiently to allow mechanical application of the organic base fertilizer to land.

Still another object of the present invention is to provide an organic base fertilizer comprising conditioned municipal sewage sludge, about 10 to 50 volume percent of lime kiln dust, about 50 to 90 volume percent of cement kiln dust or fly ash, and about 5 to 15 volume percent binder, where percentages are based on the original volume of the municipal sewage sludge, wherein the conditioned municipal sewage sludge is formed by treating municipal sewage sludge at a temperature of at least 180° F. and a pH of at least 12 for a time sufficient to destroy a significant amount of the pathogens present in the municipal sewage sludge, wherein the organic base fertilizer is in the form of agglomerated particles of particle size between about +6 to +14 Tyler mesh, and wherein the agglomerated particles contain less than about 15 weight percent moisture based on the total weight of the agglomerated particles.

These and other objects will be explained in more detail in the following description of the preferred embodiments of the invention with reference to the following drawings.

DESCRIPTION OF THE PREFERRED EMBODIMENTS

The present invention relates to a method or process for treating biological sludge, including municipal sewage sludge, to produce an organic base fertilizer suitable for application to land, whereby the pathogens present in the biological sludge are significantly reduced. The organic base fertilizer produced in the process of this invention is in the form of granules or pellets which have sufficient physical integrity to be applied to land, including agricultural lands for crops or grazing, lawns, flower gardens, fruit and vegetable gardens, orchards, and the like, as a plant nutrient using conventional application techniques. The organic base fertilizer lacks the noxious odors often associated with treated sewage sludge. The organic base fertilizer is also sufficiently stable, both physically and chemically, to allow storage until the appropriate application time. The organic base fertilizer of this invention can be applied directly as a low-grade fertilizer or nutrients and other additives can be added to produce a higher-grade fertilizer product.

Figure 1:
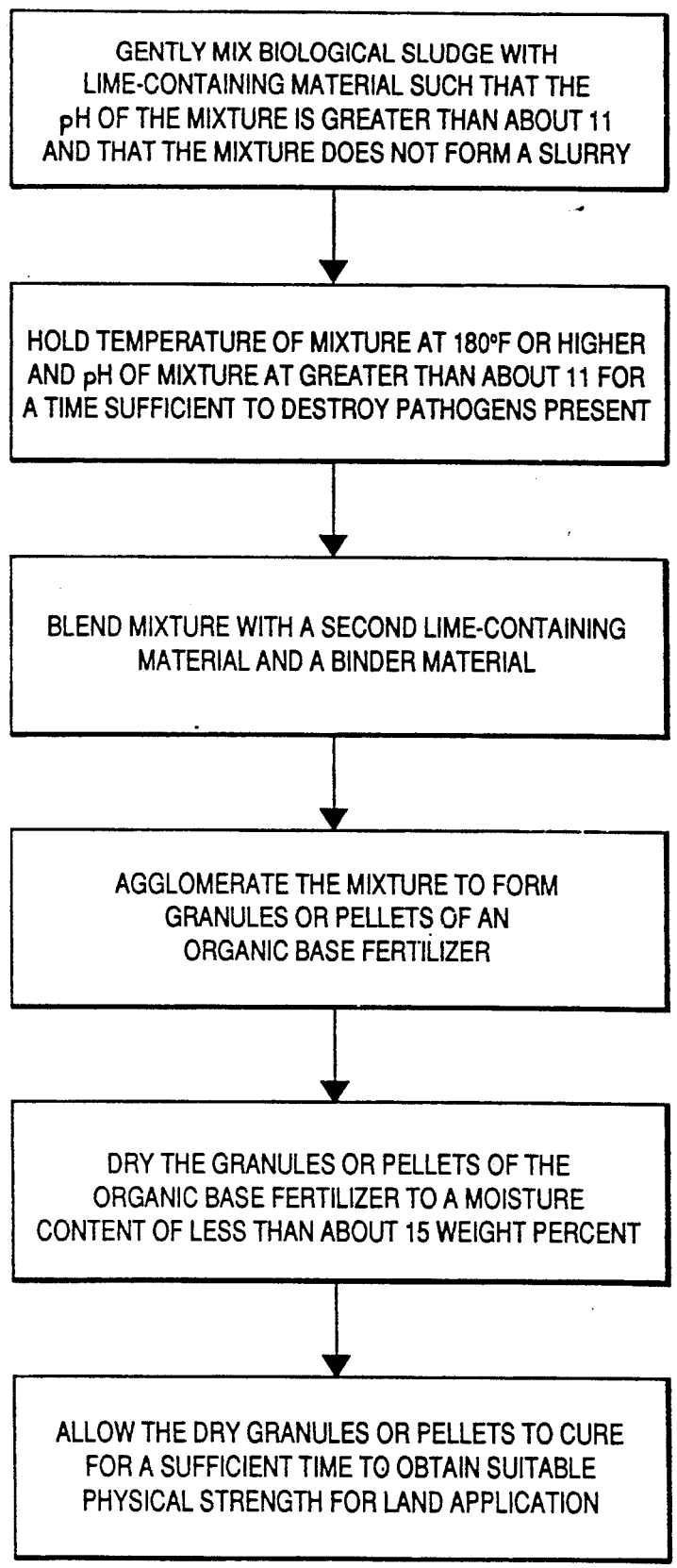
FIG. 1 is a flow chart illustrating the general method of the present invention for treating municipal sewage sludge to form a granulated organic base fertilizer.

The general process or method of this invention is illustrated in the flowchart in FIG. 1. In the first step, biological or municipal sewage sludge is mixed with a first lime-containing material in such a manner that the components are blended without the formation of a slurry. The amount of lime-containing material is that calculated to raise the pH of the mixture to a value of at least 11 (and preferably 12) during the next (i.e., "conditioning") step. Although the pH of the mixture will probably increase during this mixing step, it is not necessary that the pH increase to above 11 so long as the pH continues to rise in the next step and reaches its target value. Mixers which can thoroughly blend the materials in a relatively short time without converting the mixture into a slurry are required in this first step. Generally, paddle-type mixers which provide precision mixing without damaging the components are suitable. Examples of such mixers include paddle or soil mixers from H.C. Davis Sons Manufacturing Co., Inc., of Bonner Springs, Kansas. The duration of the mixing or blending in this first step should be kept relatively short (generally less than about ten minutes) in order to minimize any tendency to form a slurry. With a Davis paddle mixer and lime kiln dust as the lime-containing material, mixing times of 3 to 5 minutes have proven to be satisfactory. The mixing duration may vary due to the lime-containing material used, the actual composition of the sludge, and the temperature of the components. It is critical, however, that the agitation and duration of agitation be controlled so that the sludge will not "break" and form a slurry.

After the completion of the first mixing step, the non-slurried mixture is fed into a holding (i.e., "conditioning") tank or bin. In this conditioning tank or bin the temperature of the mixture is raised to at least 180° F. (and preferably between 180 and 200° F.) and a pH of at least 11 (and preferably 12) is reached. Exposure of pathogens in the sludge to such elevated temperatures and strongly basic conditions should kill or otherwise destroy a significant amount or percentage of such pathogens. The duration in the conditioning tank should be sufficient to effect the desired destruction of the pathogens. It has generally been found that a minimum 3 hour conditioning period at elevated temperatures and pH is necessary. Generally, it is preferred that the mixture be conditioned for 3 to 24 hours. With the sludges and lime kiln dust used to date, a conditioning period of about 12 hours has proven to be satisfactory. Conditioning periods of greater than 24 hours can, if desired, be used and, in some cases, may be preferred. In most cases, the blended mixture fed into the conditioning bin will have a pH of less than the target level. During the conditioning process, however, the pH will rise to the target level and should be maintained above the target level for the duration of the conditioning step. The target pH level in this conditioning step is generally above 11. The preferred target level is 12 or above as required by current EPA regulations.

Figure 3:
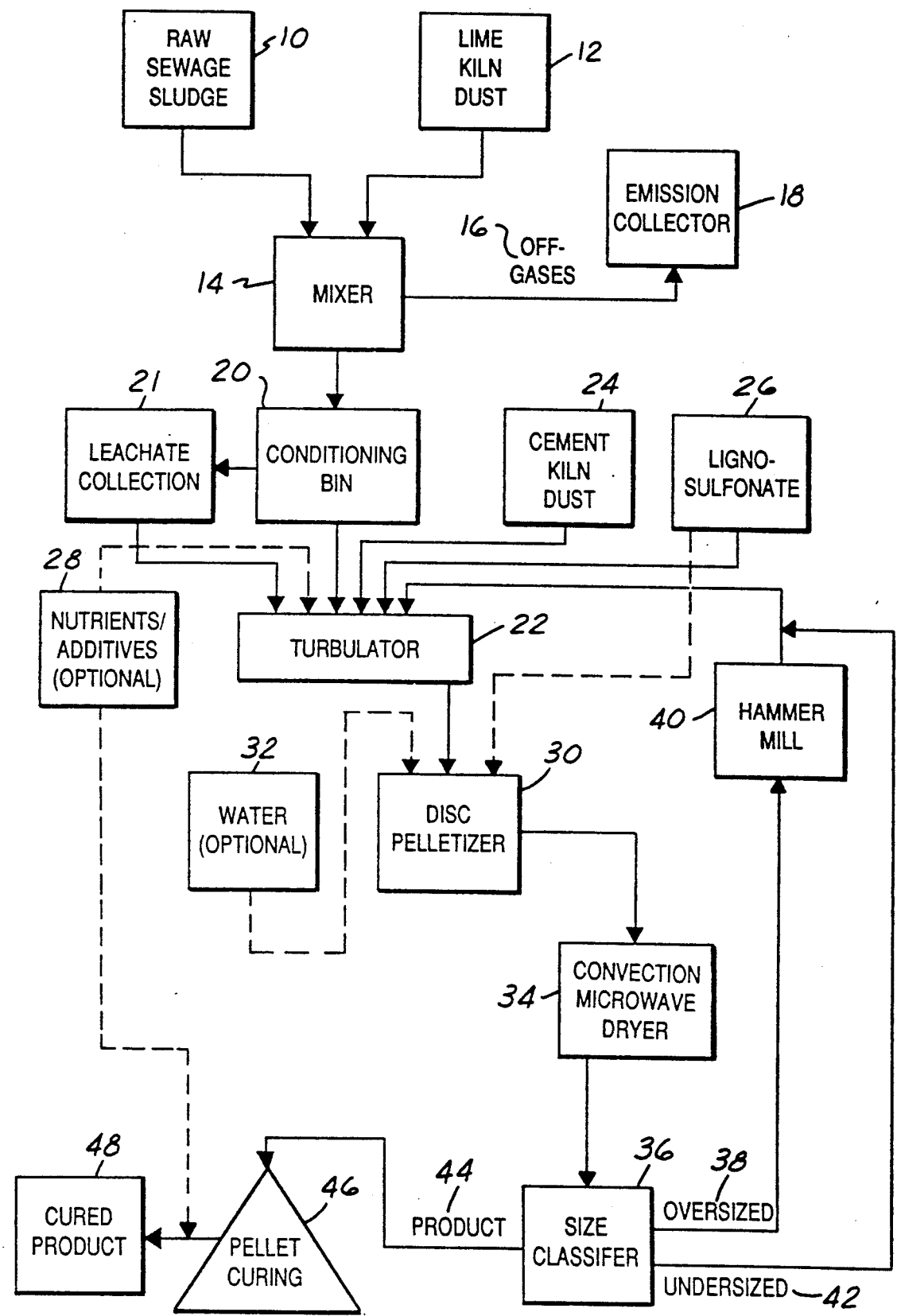
FIG. 3 is a block diagram illustrating a preferred embodiment of the present invention.

It is generally preferred, as illustrated in FIG. 3, that any leachate formed during the conditioning step is collected. This collected leachate, which may contain high concentrations of nitrates and heavy metals, can be recycled and reused in the next step. The water in such leachate can act as an additional binder in the agglomerations steps. By monitoring the nitrate and heavy metal content of the leachate, it can be added back into the process in a controlled manner such that the nitrate levels of the fertilizer product are maintained at desired levels and the heavy metal content of the fertilizer product is maintained at low levels. If necessary or desirable, the leachate can be treated prior to its reintroduction into the process to remove or reduce the heavy metal concentration. Such heavy metals can then be disposed of in accordance with existing environmental regulations.

Referring again to FIG. 1, the conditioned sludge is then blended with a second lime-containing material and a binder using an agitative agglomeration device consisting of a horizontal cylindrical chamber lined with a resilient polymer coating and a single shaft fixed within the cylindrical chamber having continuous sweeping pins mounted radially on the shaft where the shaft and sweeping pins rotate at high speeds to suspend and blend the mixture. Such a agglomerator is the only device Applicant has found which will sufficiently blend and granulate the materials for the next pelletizing step. agglomeration device is a Turbulator TM manufactured by Ferro-Tech of Wyandotte, Michigan. The Turbulator TM combines high intensity mixing and agglomeration in a single totally enclosed machine. Pin agglomerators and pin mixers, which utilize similar principles, should also be suitable for use in this invention. The purpose of the second lime-containing material is not to increase the pH of the blended materials, although it may have that effect. Rather the purpose of the second lime-containing material is to act as a "blotter" to absorb water from the conditioned sludge or any added leachate and to act as a hardener in the present and later agglomeration steps. The binder acts in a conventional manner to aid in the agglomeration steps. Suitable binders include starch gel, manganese sulfate, lignosulfonate, and the like. The preferred binder is lignosulfonate which, in addition to acting as a conventional binder, also acts as a "sweetener" to decrease or mask the urea-type odor normally associated with biological or sewage sludges. The material resulting from this blending and agglomeration step is a granular material which can be further agglomerated in the next step.

Nutrients, such as nitrogen, phosphorus, potassium, and the like, can be added, if desired, during the blending of the conditioned sludge, second lime-containing material, and binder. In this manner, the nutrient value of the organic base fertilizer of the present invention can be increased and tailor to the intended use.

The granules prepared in the previous step are fed directly into another agglomerator for further agglomeration. Although the binder added in the previous step is usually sufficient for agglomeration, water and/or additional binder can be added to assist the agglomeration process. A preferred agglomerator for use in this step is a disc pelletizer (i.e., a rotating shallow pan disc pelletizer). Suitable disk pelletizers include those provided by Ferro-Tech as well as other manufacturers. The granules produced are generally below about +6 Tyler mesh and are preferably between about +6 to +14 Tyler mesh.

The granules or pellets are then dried in a conventional oven to a moisture content of 15 weight percent or less. Preferably, the drying oven is a convection microwave oven wherein the granules or pellets can be continuous fed into the oven or a fluid bed dryer. The lower moisture content allows easier storage and handling as well as assists in the hardening process. Moisture contents significantly above about 15 weight percent can result in clumping or caking during storage and should, therefore, be avoided.

The dried granules or pellets are then allowed to cure under ambient conditions. Generally, a minimum of 2 to 4 days are required to complete curing. During the higher ambient temperatures found in the summer months, shorter curing times may be sufficient. Likewise, the lower temperatures encountered during the winter months may require longer curing times. Curing times longer than the minimum times indicated are not detrimental to the product. After completion of the curing period, the granules or pellets have sufficient physical strength to be applied using conventional fertilizer application techniques. If desired, the resulting product can be enriched by the addition of nutrients or other additives before use. The granulated organic base fertilizer has essentially no disagreeable odor (especially when lignosulfonate is used as the binder) and has significantly decreased levels of pathogens. Although Applicant has not measured the decrease in pathogen levels, the product is expected to meet both the PSRP and PFRP criteria of EPA due to the exposure of the biological or municipal sewage sludge to the elevated temperatures and elevated pH during the conditioning step.

Figure 2:
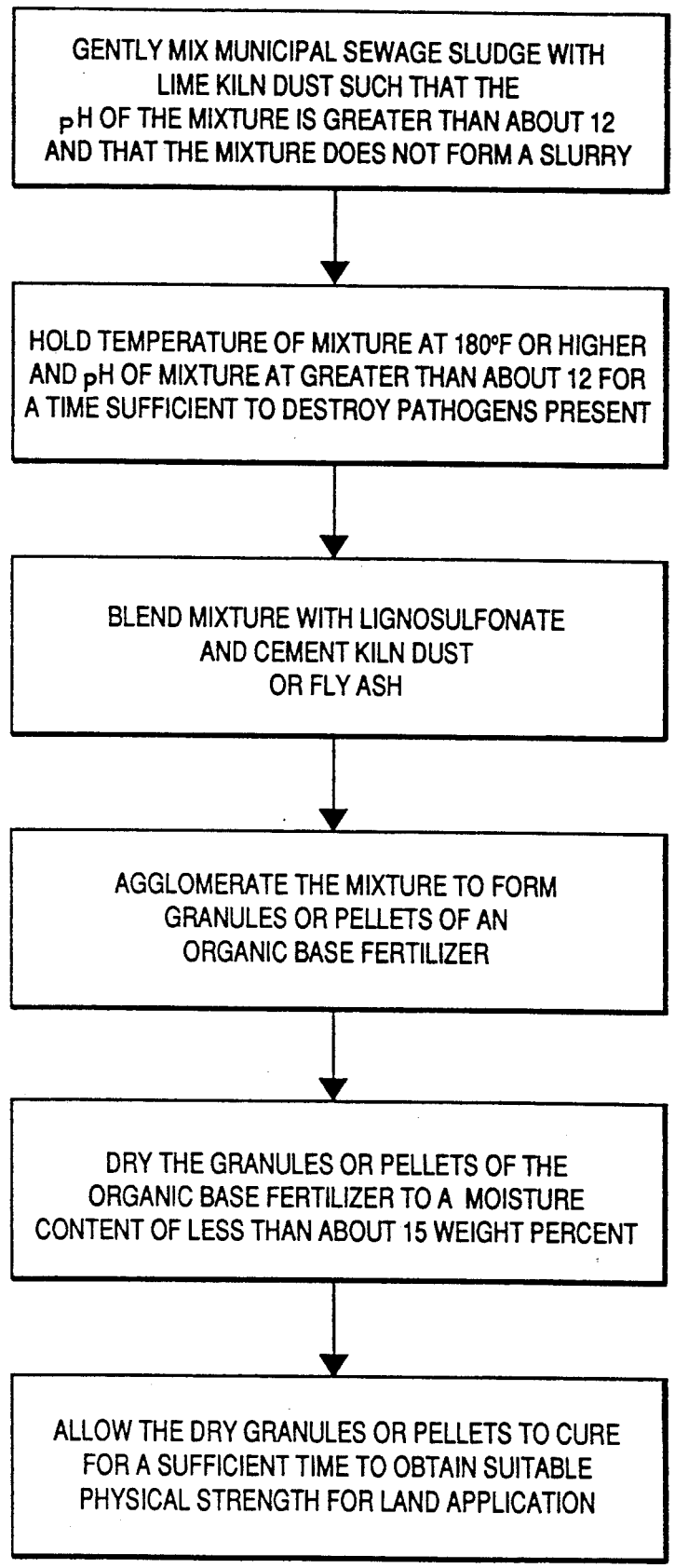
FIG. 2 is a flow chart illustrating a preferred method of the present invention for treating municipal sewage sludge to form a granulated organic base fertilizer.

A flowchart illustrating a preferred embodiment is shown in FIG. 2. This flowchart is similar to that of FIG. 1 and most of the discussions concerning FIG. 1 applies here. In the first step of the preferred process of FIG. 2, municipal sewage sludge is gently mixed with lime kiln duct in a manner designed to prevent slurry formation. The amount of lime kiln dust added is at least that amount calculated to raise the pH of the mixture to 12 or higher during the next (i.e., "conditioning") step. Suitable mixers are the paddle-type or soil mixers described above. Generally, mixing times of 3 to 5 minutes are sufficient to mix or blend the materials without cause the mixture to "break" and form a slurry. In the next step of FIG. 2, the mixture is conditioned by holding the temperature at 180° F. or higher and the pH at 12 or higher for a sufficient time to destroy or otherwise significantly reduce the pathogens present in the sewage sludge. As discussed above, generally at least three hours of conditioning are necessary to significantly reduce the pathogen content of the sewage sludge. It is generally preferred that the mixture be conditioned for about 3 to 24 hours, and most preferably, for about 12 hours. Shorter or longer conditioning times may be suitable in some cases, depending in large part on the pathogen level in the original municipal sewage sludge.

After conditioning, the mixture is blended with lignosulfonate and cement kiln dust or fly ash, or with mixtures of cement kiln dust and fly ash and lignosulfonate. As above, the conditioned sludge mixture, cement kiln dust or fly ash, and lignosulfonate are blended and at least partially agglomerated in an agitative agglomeration device consisting of a horizontal cylindrical chamber lined with a resilient polymer coating and a single shaft fixed within the cylindrical chamber having continuous sweeping pins mounted radially on the shaft where the shaft and sweeping pins rotate at high speeds to suspend and blend the mixture. Suitable mixer/agglomerators include pin agglomerator, pin mixer, and, most preferably, a Turbulator ™ mixer from Ferro-Tech or its equivalent. The cement kiln dust and/or fly ash acts as a "blotter" to absorb water and preferably should, therefore, have a high lime or CaO content. The use of fly ash in this blending step will be prefered if a lower pH fertilizer product is desired. Such a lower pH fertilizer product can be used to considerable advantage on high pH soils. Mixture of cement kiln dust and fly ash can be used to produce intermediate pH fertilizer products for specific application needs. The lignosulfonate is a binder in both this first agglomeration step and in the next agglomeration step. If desired, additional nutrients or other additives can be added during this blending and agglomeration step.

The granules from the first agglomeration step are fed directly to a second agglomeration device which, preferably, is a disc pelletizer. The lignosulfonate added in the previous step acts as a binder in this second agglomeration step. Water can also be added, if desired, to act as a further binder. If desired, additional lignosulfonate can also be added. The granules or pellets produced in this agglomeration step are generally less than about +6 Tyler mesh, although large or smaller particles may be suitable for some applications. Particle size can be controlled and modified by adjusting the operating parameters of the disc pelletizer.

The granules or pellets from the disc pelletizer are then dried to a moisture content of 15 weight percent or less. Although many oven types and designs can be used, it is generally preferred that a convection microwave oven with a continuous belt or a fluid bed dryer be employed. After drying, the granules or pellets can be classified for size. Generally, particles sizes of less than about +6 Tyler mesh are preferred, with a range of about +6 to +14 Tyler mesh being most preferred.

The material is then stored under ambient temperature conditions to allow the particles to complete curing and hardening. It is generally preferred that at least during the initial curing stage that the granules or pellets are protected from rain. Generally, the material will have cured sufficiently within about four days to allow handling without significant damage or deterioration to the physical structure of the product. Nutrients or other additives can, if desired, be blended with the cured granules or pellets to produce a higher-grade fertilizer. Or the cured product can be used directly as a lower-grade fertilizer or soil conditioner.

FIG. 3 is a block diagram illustrating a preferred embodiment of the present invention. As illustrated, this preferred embodiment defines a closed system with recycle or recovery of by-products. Raw sewage sludge 10 and lime kiln dust 12 are blended together in mixer 14. Mixer 14 is preferably a paddle-type or equivalent mixer which can effectively blend the materials without producing a slurry. Any off-gases 16 (e.g., ammonia) are collected in a conventional emission collector 18. The blended material from the mixer 14 are fed into the conditioning bin 20 where the temperature is held at 180° F. or higher and the pH is held at 12 or above for about 3 to 24 hours to kill or otherwise destroy pathogens present in the raw sewage sludge. Leachate from the conditioning bin 20 is collected and stored in the leachate tank 21 for eventual recycle back into the process. This leachate may contain high levels of nitrates and heavy metals leached from the conditioned material. Although not shown, leachate from any other part of the process can be collected in tank 21 for eventual recycle. After conditioning, the material from conditioning bin 20 is fed to a Turbulator ™ or equivalent blender/agglomerator 22. Cement kiln dust or fly ash 24 and lignosulfonate or equivalent binder 26 are also fed into the Turbulator ™ 22 with the conditioned material. Leachate from leachate tank 21 is also fed into the blender/agglomerated 22 in controlled manner so as to maintain the nitrate and heavy metal concentrations of the finished product at the desired levels. If desired, the leachate from tank 21 can also be treated (not shown) prior to being recycled to the blender/agglomerator 22 in order to reduce the heavy metal content. These materials are blended and at least partially agglomerated in the Turbulator ™ 22. Nutrients or other additives 28 can also be added to the blender/agglomerator 22 to increase the fertilizer value or otherwise enhance the value of the final product. From the Turbulator ™ 22, the product is fed directly into a second agglomerator 30, preferably a disc pelletizer. If desired, water 32 and/or additional lignosulfonate binder 26 can be injected into the agglomerator 30. The water 32 can act as an additional binder. After pelletizing, the resulting granules or pellets are dried to a moisture content of 15 weight percent or less in the dryer 34, preferably a convection microwave dryer with a continuous belt feed or a fluid bed dryer. After drying, the granules or pellets are fed into a size classifier 36. Preferably, the size classifier 36 is a multi-level screening device. Oversized material 38 (generally greater than about 6 Tyler mesh) from the size classifier 36 is reduced in size using a hammer mill 40 or equivalent grinding device. Undersized material 42 (generally less than about +14 Tyler mesh) from the size classifier 36 is collected with the output of the hammer mill 40 and recycled to the Turbulator 22. Product 44 from the size classifier 36 is then stored for curing. Pellet curing 46 generally requires approximately four days, although in some cases shorter or longer periods may be required. Additional nutrients or other additives 28 may, if desired, be blended or added to the granules or pellets after curing to obtain the final cured product 48. Or the final cured product 48 may be used directly as a low-grade fertilizer or soil conditioner without any added nutrients or other additives.

As noted above, a first lime-containing material, preferably lime kiln dust, is added to the biological sludge or sewage sludge in an amount sufficient to raise the pH of the resulting mixture to at least 11, and preferably 12 or higher, during the conditioning step. The actual amount of the first lime-containing material will depend, therefore, on the composition of the sludge and the lime content of the lime-containing material. Generally, the solid content of the sludge will be in the range of about 15 to 30 weight percent. And the amount of lime or CaO in the lime-containing material will normally be in the range of 45 to 95 weight percent. Lime kiln dust is generally preferred as the lime-containing material due to its low cost and availability as a waste product. Generally, in order to obtain the desired pH values in the conditioning step, it is preferred that the ratio of the volume percent of CaO in the lime-containing material to the volume percent of solids in the biological sludge is in the range of about 0.4 to 1.7. By way of illustration, the following table presents suitable levels of lime kiln dust in the biological sludge/lime kiln dust mixture to obtain a pH level of 12 or higher in the conditioning step where the biological sludge contains about 20 volume percent solids.

TABLE

| Lime Kiln Dust CaO Content (Weight Percent) | Range of Added Lime Kiln Dust (Vol. Percent) | Range of Ratio of CaO in Lime Kiln Dust to Solid Content in Biological Sludge |
| --- | --- | --- |
| 95 | 11 to 35 | 0.5 to 1.7 |
| 90 | 11 to 36 | 0.5 to 1.6 |
| 85 | 12 to 38 | 0.5 to 1.6 |
| 80 | 13 to 39 | 0.5 to 1.6 |
| 75 | 14 to 41 | 0.5 to 1.5 |
| 70 | 15 to 42 | 0.5 to 1.5 |
| 65 | 16 to 44 | 0.5 to 1.4 |
| 60 | 17 to 45 | 0.5 to 1.4 |
| 55 | 17 to 47 | 0.5 to 1.3 |
| 50 | 18 to 45 | 0.4 to 1.2 |
| 45 | 18 to 50 | 0.4 to 1.2 |

The percentages of added lime kiln dust in the above table are based on the original amount of sludge being treated. (For example, if 100 volumes of sludge are to be treated, 50 volumes of lime kiln dust added to the sludge would be equivalent to 50 volume percent of added lime kiln dust.) These ranges of the lime kiln dust are provided for guidance only. The critical objective is to achieve the desired pH level in the conditioning step in order to kill or otherwise destroy pathogens present in the sludge. Lower or higher amounts of lime kiln dust or other lime-containing material can be used so long as the desired pH is reached. Generally, excessive amounts of the lime-containing materials (i.e., amounts greatly exceeding the amount needed for the desired pH) should be avoided. With high CaO materials, excessive levels of the lime-containing materials will result in exothermic reactions. And with low CaO materials, excessive levels of the lime-containing materials may significantly increase dust levels during processing. Generally, the amount of lime kiln dust is in the range of about 10 to 50 volume percent, and preferably in the range of about 30 to 40 volume percent, based on the original volume of sludge to be treated.

The second lime-containing material, preferably cement kiln dust, fly ash, or mixtures thereof, is added after the conditioning step and acts as a "blotter" to absorb water in the conditioned sludge. The amount of this second lime-containing material needed will depend, in large part, on the amount of water in the conditioned sludge. Generally, the higher the solid content of the conditioned sludge, the less of the second lime-containing material will be needed. Generally, the conditioned sludge will be about 80 weight percent solids. In most cases, the amount of the second lime-containing material will be in the range of about 50 to 90 volume percent based on the original volume of the sludge being treated. Preferably, the amount of the second lime-containing material will be in the range of about 60 to 70 volume percent based on the original volume of the sludge being treated. The use of fly ash as the second lime-containing material allows for the reduction of the high pH levels generated in the conditioning step and will, therefore, allow for production of a lower pH fertilizer product. Such lower pH product may be especially useful when applied to high pH soils. By employing mixtures of cement kiln dust and fly ash, intermediate pH level fertilizer products can be obtained.

The binder adder after the conditioning step is an conventional organic binder. Suitable binders include starch gel, manganese sulfate, lignosulfonate, and the like. Generally, lignosulfonate (a byproduct from the pulp and paper industry) is preferred since it not only is an effective binder for the product of this invention, it also helps to reduce the urea or sewage odor associated with the sludge. Generally, the amount of the binder should be in the range of about 5 to 15 volume percent, and preferably about 10 to 12 volume percent, based on the original volume of the sludge to be treated.

The method and fertilizer product of the present invention provides a cost-effective solution to the problem of treating biological sludge and especially municipal sewage sludge. The fertilizer product is readily suited for use as a low-grade fertilizer or, with the appropriate additives, as a higher-grade fertilizer in a wide range of applications. This fertilizer product is in a granular or pelletized form which is readily adaptable to current fertilizer handling, usage, and application technologies, procedures, and equipment. In one preferred embodiment, this process uses waste materials (municipal sewage sludge, lime kiln dust, and cement kiln dust or fly ash) to create a product that can be sold as a fertilizer or soil conditioner. The method of this invention are expected to meet, and probably exceed, the EPA requirements for a Process to Significantly Reduce Pathogens (PSRP) and/or a Process to Further Reduce Pathogens (PFRP) under 40 CFR Part 257.

That which is claimed is:

1. A method for treatment of biological sludge to form a granulated organic base fertilizer, said method consisting essentially of the following steps:
   (1) gently mixing the biological sludge with sufficient first lime-containing material calculated to raise the pH of the mixture to at least 11, wherein the mixing and the duration of mixing is such that the mixture is not converted into a slurry;
   (2) holding the mixture formed in step (1) at a temperature of at least 180° F. and a pH of at least 11 for a time sufficient to destroy a significant amount of any pathogens present in the biological sludge;

(3) blending the mixture of step (2) with a second lime-containing material and a binder;

(4) agglomerating the mixture of step (3) to form a granulated organic base fertilizer;

(5) drying the granulated organic base fertilizer to a moisture content of less than about 15 weight percent; and (6) storing the dried granulated organic base fertilizer for a time sufficient to allow the granulated organic base fertilizer to cure sufficiently to allow mechanical application of the organic base fertilizer to land.

2. A method as defined in claim 1, wherein the first lime-containing material is lime kiln dust, the second lime-containing material is cement kiln dust or fly ash, and the binder is lignosulfonate.

3. A method as defined in claim 2, wherein the second lime-containing material is cement kiln dust.

4. A method as defined in claim 2, wherein the second lime-containing material is fly ash.

5. A method as defined in claim 2, wherein the pH in step (2) is at least 12.

6. A method as defined in claim 5, wherein the mixture in step (1) is mixed for less than about 10 minutes and wherein the mixture in step (2) is held at a temperature of about 180° to 200° F. for at least about 3 hours.

7. A method as defined in claim 6, wherein the mixture in step (2) is held at a temperature of about 180° to 200° F. for about 3 to 24 hours.

8. A method as defined in claim 7, wherein the blending in step (2) is carried out using an agitative agglomeration device consisting of a horizontal cylindrical chamber lined with a resilient polymer coating and a single shaft fixed within the cylindrical chamber having continuous sweeping pins mounted radially on the shaft where the shaft and sweeping pins rotate at high speeds to suspend and blend the mixture.

9. A method as defined in claim 8, wherein the agglomeration in step (3) is carried out using a disc pelletizer.

10. A method as defined in claim 9, wherein step (1) is carried out in a closed system in order to minimize dust and to allow for collection of off-gases and wherein leachate formed in step (2) is collected and recycled.

11. A method as defined in claim 9, wherein, for step (1), the amount of lime kiln dust is in the range of about 10 to 50 volume percent based on the volume of biological sludge and wherein the amount of binder added in step (3) is in the range of 5 to 15 volume percent based on the volume of biological sludge.

12. A method as defined in claim 11, wherein the biological sludge contains about 15 to 30 volume percent solids.

13. A method as defined in claim 11, wherein the amount of lime kiln dust is in the range of about 15 to 30 volume percent based on the volume of biological sludge and wherein the amount of binder is in the range of 10 to 12 volume percent based on the volume of biological sludge.

14. A method as defined in claim 13, wherein the biological sludge contains about 15 to 30 volume percent solids.

15. A method as defined in claim 1, wherein additional nutrients are blended with the mixture in step (3) to increase the nutrient value of the base fertilizer.

16. A granulated organic base fertilizer containing treated biological sludge, lime kiln dust, cement kiln dust or fly ash, and a binder, where said granulated organic base fertilizer is prepared by a method consisting essentially of the following steps:

(1) gently mixing the biological sludge with sufficient lime kiln dust calculated to raise the pH of the mixture to at least 11, wherein the mixing and the duration of mixing is such that the mixture is not converted into a slurry;

(2) holding the mixture formed in step (1) at a temperature of at least 180° F. and a pH of at least 11 for a time sufficient to destroy a significant amount of any pathogens present in the biological sludge;

(3) blending the mixture of step (2) with the binder and cement kiln dust or fly ash;

(4) agglomerating the mixture of step (3) to form a granulated organic base fertilizer;

(5) drying the granulated organic base fertilizer to a moisture content of less than about 15 weight percent; and (6) storing the dried granulated organic base fertilizer for a time sufficient to allow the granulated organic base fertilizer to cure sufficiently to allow mechanical application of the organic base fertilizer to land.

17. A granulated organic base fertilizer as defined in claim 16, wherein the binder is lignosulfonate.

18. A granulated organic base fertilizer as defined in claim 17 containing treated biological sludge, lime kiln dust, cement kiln dust, and lignosulfonate.

19. A granulated organic base fertilizer as defined in claim 17 containing treated biological sludge, lime kiln dust, fly ash, and lignosulfonate.

20. A granulated organic base fertilizer as defined in claim 17, wherein the pH in step (2) is at least 12, wherein the mixture in step (1) is mixed for less than about 10 minutes, and wherein the mixture in step (2) is held at a temperature of about 180° to 200° F. for at least about 3 hours.

21. A granulated organic base fertilizer as defined in claim 20, wherein the mixture in step (2) is held at a temperature of about 180° to 200° F. for at about 3 to 24 hours.

22. A granulated organic base fertilizer as defined in claim 21, wherein the blending in step (2) is carried out using an agitative agglomeration device consisting of a horizontal cylindrical chamber lined with a resilient polymer coating and a single shaft fixed within the cylindrical chamber having continuous sweeping pins mounted radially on the shaft where the shaft and sweeping pins rotate at high speeds to suspend and blend the mixture.

23. A granulated organic base fertilizer as defined in claims 22, wherein the agglomeration in step (3) is carried out using a disc pelletizer.

24. A granulated organic base fertilizer as defined in claim 23, wherein step (1) is carried out in a closed system in order to minimize dust and to allow for collection of off-gases and wherein leachate formed in step (2) is collected and recycled.

25. A granulated organic base fertilizer as defined in claim 23, wherein, for step (1), the amount of lime kiln dust is in the range of about 10 to 50 volume percent based on the volume of biological sludge and wherein the amount of binder added in step (3) is in the range of 5 to 15 volume percent based on the volume of biological sludge.

26. A granulated organic base fertilizer as defined in claim 25, wherein the biological sludge contains about 15 to 30 volume percent solids.

27. A granulated organic base fertilizer as defined in claim 25, wherein the amount of lime kiln dust is in the range of about 30 to 40 volume percent based on the volume of biological sludge and wherein the amount of binder is in the range of 10 to 12 volume percent based on the volume of biological sludge.

28. A granulated organic base fertilizer as defined in claim 27, wherein the biological sludge contains about 15 to 30 volume percent solids.

29. A granulated organic base fertilizer as defined in claim 16, wherein additional nutrients are blended with the mixture in step (3) to increase the nutrient value of the base fertilizer.

* * * * *